US007001580B2

(12) United States Patent
Baran, Jr. et al.

(10) Patent No.: US 7,001,580 B2
(45) Date of Patent: Feb. 21, 2006

(54) EMULSIONS INCLUDING SURFACE-MODIFIED ORGANIC MOLECULES

(75) Inventors: Jimmie R. Baran, Jr., Prescott, WI (US); James S. Stefely, Woodbury, MN (US); Stephen W. Stein, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 112 days.

(21) Appl. No.: 10/335,495

(22) Filed: Dec. 31, 2002

(65) Prior Publication Data

US 2004/0127612 A1 Jul. 1, 2004

(51) Int. Cl.
  *C01B 31/00* (2006.01)
(52) U.S. Cl. .......... 423/445 B; 423/445; 423/DIG. 39; 423/DIG. 40
(58) Field of Classification Search ................ 423/445, 423/DIG. 39, DIG. 40, 445 B
  See application file for complete search history.

(56) References Cited

U.S. PATENT DOCUMENTS

| 2,801,185 | A | | 7/1957 | Iler |
|---|---|---|---|---|
| 4,379,201 | A | | 4/1983 | Heilmann et al. |
| 4,455,205 | A | | 6/1984 | Olson et al. |
| 4,478,876 | A | | 10/1984 | Chung |
| 4,486,504 | A | | 12/1984 | Chung |
| 4,491,508 | A | | 1/1985 | Olson et al. |
| 4,522,958 | A | | 6/1985 | Das et al. |
| 4,737,559 | A | | 4/1988 | Kellen et al. |
| 5,037,579 | A | | 8/1991 | Matchett |
| 5,258,225 | A | | 11/1993 | Katsamberis |
| 5,387,617 | A | | 2/1995 | Hedstrand et al. |
| 5,401,785 | A | | 3/1995 | Kumagai et al. |
| 5,612,021 | A | * | 3/1997 | Mellul .......................... 424/61 |
| 5,648,407 | A | | 7/1997 | Goetz et al. |
| 5,879,715 | A | | 3/1999 | Higgins et al. |
| 6,001,342 | A | * | 12/1999 | Forestier et al. ........... 424/76.1 |
| 6,004,567 | A | | 12/1999 | Marchi-Lemann et al. |
| 6,020,419 | A | | 2/2000 | Bock et al. |
| 6,068,835 | A | | 5/2000 | Franzke et al. |
| 6,126,948 | A | | 10/2000 | Simonnet et al. |
| 6,177,414 | B1 | | 1/2001 | Tomalia et al. |
| 6,245,318 | B1 | | 6/2001 | Klibanov et al. |
| 6,258,896 | B1 | | 7/2001 | Abuelyaman et al. |
| 6,280,748 | B1 | | 8/2001 | Morita et al. |
| 6,391,326 | B1 | | 5/2002 | Crepeau et al. |
| 6,436,424 | B1 | | 8/2002 | Vogel et al. |
| 6,440,399 | B1 | | 8/2002 | Gers-Barlag et al. |
| 2002/0128336 | A1 | | 9/2002 | Kolb et al. |
| 2002/0160030 | A1 | | 10/2002 | Gers-Barlag et al. |
| 2002/0172716 | A1 | | 11/2002 | Walt et al. |
| 2003/0165553 | A1 | | 9/2003 | Gers-Berlag et al. |
| 2003/0228339 | A1 | | 12/2003 | El-Nokaty et al. |
| 2004/0067208 | A1 | | 4/2004 | Lennon et al. |

FOREIGN PATENT DOCUMENTS

| EP | 0 608 908 A2 | | 8/1994 |
|---|---|---|---|
| EP | 1 057 841 A2 | | 12/2000 |
| EP | 1 017 745 B1 | | 5/2001 |
| JP | 6-242543 | | 9/1994 |
| JP | 06242543 A | * | 9/1994 |
| JP | 2001348214 A | * | 12/2001 |
| WO | WO 00/06495 | | 2/2000 |
| WO | WO 01/85324 A1 | | 11/2001 |

OTHER PUBLICATIONS

Translation to Shigeru et al. (JP 2001348214), Dec. 18, 2001.*
Website Article: Dendritech®, Inc., "Current Applications", http://www.dendritech.com/applications.html, Aug. 29, 2002.
Website Article: Dendritech®, Inc., "PAMAM Dendrimers", http://www.dendritech.com/pamam.html, Aug. 29, 2002.
Website Article: Dendritech®, Inc., "Pricing & Ordering Information", http://www.dendritech.com.pricing.html, Aug. 29, 2002.
"Dispersants", Encyclopedia of Chemical Technology, Fourth Editionm Kirk-Othmer, vol. 8, Deuterium and Tritum to Elastomers, Polyethers, 1993, pp. 293-311.
Fisher et al., "Effect of Silica Nanoparticle Size on the Stability of Alumina/Silica Suspensions", J. Am. Comm. Soc., 84[4], pp. 713-718, 2001.
"EMULSIONS", Encyclopedia of Chemical Technology, Fourth Edition, Kirk-Othmer, vol. 9, Elastomers, Polyisoprene To Expert Systems, 1994, pp. 393-413.
"FOAMS", Encyclopedia of Chemical Technology, Fourth Edition, Kirk-Othmer, vol. 11, Flavor Characterization To Fuel Cells, 1994, pp. 783-805.
Tohver et al., "Nanoparticle Engineering of Complex Fluid Behavior", Langmuir 2001, 17, pp. 8414-8421.
Wasan et al., "New Vistas in Dispersion Science and Engineering", AIChE Journal, Mar. 2003, vol. 49, No. 3, pp. 550-556.
Website Article: Jacoby, "Nanoparticles Stabilized Colloids", Chemical & Engineering news, http://pubs.acs.org/cen/topstory/8001/5001notw8.html, Nov. 14, 2002.
"Nanotechnology could save the ozone layer", nanotechweb.org, Jan. 30, 2003.
Binks, "Particles as surfactants—similarities and differences", ELSEVIER, Currnet Opinion in Colloid & Interface Science 7 (2002), pp. 21-41.
Mill et al., "Emulsion", in AccessScience@McGraw-Hill, http://www.accessscience.com, DOI 10.1036/1097-8542. 231100, last modified: Apr. 10, 2000.
M. Samy El-shall, "Nanoparticles", in AccessScience@McGraw-Hill, http://www.accessscience.com, DOI 10.1036/1097-8542. YB031425, last modified: Dec. 23, 2002.

* cited by examiner

*Primary Examiner*—Kelechi C. Egwim

(57) ABSTRACT

The invention is related to emulsions containing surface-modified organic molecules, organic polymeric microspheres, or combinations thereof.

2 Claims, No Drawings

EMULSIONS INCLUDING SURFACE-MODIFIED ORGANIC MOLECULES

BACKGROUND

This invention relates to liquid-in-liquid emulsions.

Traditional emulsions are made up of two phases: a dispersed phase and a continuous phase. The most common emulsions consist of only two liquids, water and oil. An o/w (oil-in-water) emulsion consists of oil droplets dispersed in a continuous aqueous phase, and a w/o (water-in-oil) emulsion consists of water droplets dispersed in oil. Multiple emulsions may be formed, for example, when water droplets in a continuous oil phase themselves contain dispersed oil droplets. Emulsification consists of the break-up of large droplets into smaller droplets due to shear forces. Typically, emulsifiers are used to stabilize emulsions through a reduction in interfacial tension. Increasing the viscosity of the continuous phase may also prevent phase separation of emulsions.

SUMMARY

In one aspect, the invention provides an emulsion that comprises a liquid continuous phase comprising surface-modified organic molecules, and a dispersed liquid phase. The organic molecules are selected from surface-modified fullerenes, surface-modified dendrimers, and combinations thereof.

In another aspect, the invention provides an emulsion that comprises a liquid continuous phase comprising organic polymeric microspheres, and a dispersed liquid phase.

In another aspect, the invention provides multiple emulsions wherein each liquid phase that contains a dispersed liquid phase contains surface-modified organic molecules or organic polymeric microspheres, or a combination of both.

DETAILED DESCRIPTION

The emulsions of the invention are liquid-in-liquid dispersions or emulsions. The stabilized emulsions comprising a continuous phase and a dispersed phase are rendered by incorporation of an effective amount of surface-modified organic molecules into the continuous phase of the composition. The surface-modified molecules maintain the emulsion without reducing surface tension at the continuous-dispersed phase interface.

In another embodiment, the emulsions of the invention consist essentially of a continuous liquid phase and a dispersed liquid phase and surface-modified organic molecules or organic polymeric microspheres incorporated in the continuous phase.

The emulsions of the invention may be free of traditional surfactants, detergents, proteins, and emulsifiers and other compounds that stabilize emulsions through a reduction in surface tension. The emulsions of the invention are typically stable from days to years under constant temperature.

The emulsions of the invention may be oil-in-water or water-in-oil emulsions (as those terms are generally defined in the art) or multiple emulsions. An example of a multiple emulsion is an oil-in-water emulsion (dispersed phase) in an oil continuous phase or the opposite multiple emulsion. For multiple emulsions of the invention, different types of surface-modified organic molecules or organic polymeric microspheres are or may be needed for each phase that contains another dispersed phase.

The surface-modified organic molecules and organic polymeric microspheres stabilize emulsions without lowering the surface tension at the interface between the dispersed and continuous phases. It is theorized that the surface-modified organic molecules or organic polymeric microspheres become situated between the dispersed phase droplets in increasing concentration as the liquid continuous phase drains from between the dispersed phase droplets. The increased concentration of surface-modified organic molecules between the dispersed phase droplets prevents the dispersed droplets from contacting one another and coalescing.

The surface-modified organic molecules are substantially soluble in the continuous phase. The molecules may be directly soluble in the continuous phase or a soluble derivative of a precursor molecule may be prepared, for example, by alkylation. The surface-modified organic molecules and organic polymeric microspheres are selected to be compatible with the continuous phase.

One useful method of assessing the compatibility of the surface-modified organic molecules and organic polymeric microspheres with the continuous phase includes the step of combining the surface-modified organic molecules and/or organic polymeric microspheres and the continuous phase and observing whether the surface-modified organic molecules and/or organic polymeric microspheres appear to dissolve in the continuous phase.

Specific examples of useful surface-modified organic molecules include alkylated buckminsterfullerenes (fullerenes) and alklylated polyamidoamine (PAMAM) dendrimers. Specific examples of fullerenes include $C_{60}$, $C_{70}$, $C_{82}$, and $C_{84}$. Specific examples of PAMAM dendrimers include those of Generations 2 through 10 (G2–G10), available from Aldrich Chemical Company, Milwaukee, Wis. PAMAM dendrimers are currently commercially available with primary amine, hydroxyl, carboxylate sodium salt, mixed amine/hydroxyl, and $C_{12}$ surface functional groups. The alkyl groups on the organic molecules may be straight or branched and may range from at least $C_3$ to not greater than $C_{30}$ and may be any size or range in between $C_3$ and $C_{30}$. For example, the ranges may be $C_3$ to $C_{22}$; $C_3$ to $C_{18}$; $C_3$ to $C_{12}$; or $C_3$ to $C_8$, and any combination or integer therebetween. The surface-modified organic molecules may be present in the continuous phase at a level of from at least 0.1 percent by weight.

Specific examples of a useful organic polymeric microspheres include microspheres that comprise polystyrene, available from Bangs Laboratories, Inc., Fishers, Ind., as powders or dispersions. Average particle sizes of the polystyrene microspheres range from at least 20 nm to not more than 60 nm. Current commercially available average particle sizes are 20, 30, 50, and 60 nm. The organic polymeric microspheres may be present in the continuous phase at a level of from at least 0.1 percent by weight.

The emulsions of the invention have a liquid continuous phase. The continuous phase may be made up of one or more miscible or soluble constituents so long as the dispersed phase may be dispersed in all of the constituents of the continuous phase.

Example continuous phases include water, organic liquids including, e.g., acids, alcohols, ketones, aldehydes, amines, amides, esters, glycols, ethers, hydrocarbons, halocarbons, monomers, oligomers, lubricating oils, vegetables oils (including mono- di, and tri-glycerides), silicone oils, moisturizing oils (e.g., mineral and jojoba oils), fuel oils, fuels (including kerosene, gasoline, diesel fuel), oligomers of ethylene glycol, alkyl and aryl nitro compounds, partially or fully fluorinated compounds, and polymers.

The emulsions of the invention have a liquid dispersed phase that is dispersed within the continuous liquid phase. The liquid dispersed phase may comprise one or more liquids that are miscible or soluble and that are dispersed within the liquid continuous phase. Examples of suitable liquid dispersed phases include water and all of the organic materials listed above for use as a continuous phase.

The emulsions of the invention may also contain surface-modified nanoparticles in combination with surface-modified organic molecules and organic polymeric microspheres. Surface-modified nanoparticles are described in U.S. Publication No. 2002-0128336-A1, incorporated herein by reference for the description of the surface-modified inorganic nanoparticles.

Each phase may also contain other dissolved or soluble compounds or components which are added to achieve a desired effect, for example, salts, drugs, dyes, flame retardants, and the like.

The emulsions of the invention are generally made by blending the phases and mixing. Another way to make the emulsions of the invention is to blend the surface-modified organic molecules or organic polymeric microspheres, or combinations thereof with the continuous phase (or other phases in the case of multiple emulsions) and then adding the dispersed phase with agitation.

The emulsions of the invention may be useful in foods, cosmetics, pharmaceuticals, and the like.

The invention will now be described further by way of the following examples.

EXAMPLES

All solvents and reagents were obtained from Aldrich Chemical Company, unless otherwise noted. All percents and amounts are by weight unless otherwise specified.

Preparation of Octyl-Substituted STARBURST® Dendrimer, Generation 2 (Octyl-SG-2)

A 50 mL round-bottom flask was charged with 0.74 g (0.23 mol) of STARBURST® (PAMAM-OH) Dendrimer, Generation 2 (obtained from Aldrich Chemical Co.). N,N-Dimethylformamide (10 g) and triethylamine (0.37 g; 0.0036 mol) were added to the flask and the mixture was magnetically stirred until the dendrimer was dissolved. Octanoyl chloride (0.59 g; 0.0036 mol) was added to the flask dropwise via syringe over a period of about 5 minutes. The mixture was stirred at room temperature for about 2 hours, after which water (20 g) was added to the flask. The mixture was stirred at room temperature overnight. The reaction mixture was poured into a separatory funnel and was extracted with toluene (20 g). The phases were separated and the aqueous phase was extracted two more times with toluene (10 g each time). The combined toluene extracts concentrated to dryness using a rotary evaporator. The resultant orange-brown solid was dried in a vacuum oven at 60° C. and 250 mm Hg pressure for 3 hours. The dry solid was then dissolved in about 30 g of toluene. This solution was filtered through a 0.2 micrometer syringe filter (Gelman ACRODISC syringe filter, Waters Corp., Milford, Mass.) to afford a clear yellow solution. The toluene solution was concentrated to dryness on a rotary evaporator to give 1.13 g of an orange-brown solid. Analysis of the solid by nuclear magnetic resonance spectrometry indicated complete esterification of the hydroxyl groups.

Preparation of Octyl-Substituted STARBURST® Dendrimer, Generation 4 (Octyl-SG-4)

A 50 mL round-bottom flask was charged with 0.33 g (0.023 mol) of STARBURST® (PAMAM-OH) Dendrimer, Generation 4 (obtained from Aldrich Chemical Co.). N,N-Dimethylformamide (10 g) and triethylamine (0.15 g; 0.0015 mol) were added to the flask and the mixture was magnetically stirred until the dendrimer was dissolved. Octanoyl chloride (0.24 g; 0.0015 mol) was added to the flask dropwise via syringe over a period of about 5 minutes. The mixture was stirred at room temperature for about 2 hours, after which water (20 g) was added to the flask. The mixture was stirred at room temperature overnight. The reaction mixture was poured into a separatory funnel and was extracted with toluene (20 g). The phases were separated and the aqueous phase was extracted two more times with toluene (10 g each time). The combined toluene extracts concentrated to dryness using a rotary evaporator. The resultant orange-brown solid was dried in a vacuum oven at 60° C. and 250 mm Hg pressure for 3 hours. The dry solid was then dissolved in about 30 g of tetrahydrofuran. This solution was filtered through a 0.2 $\mu$m syringe filter (Gelman ACRODISC syringe filter) to afford a clear yellow solution. The tetrahydrofuran solution was concentrated to dryness on a rotary evaporator to give 0.48 g of an orange-brown solid. Analysis of the solid by nuclear magnetic resonance spectrometry indicated complete esterification of the hydroxyl groups.

Preparation of Octyl-Substituted $C_{60}$ (Octyl-$C_{60}$)

A 50 mL round-bottom flask was dried by passing a stream of nitrogen gas through it while heating the flask with a gas flame. After the flask had cooled, it was charged with 10 mL of dry tetrahydrofuran and 0.1 g $C_{60}$, and the solution was then deoxygenated by briefly bubbling dry nitrogen gas through it. A solution of octylmagnesium iodide in diethyl ether (20 mL) was added to the flask via syringe as the solution was magnetically stirred. The dark reaction mixture was allowed to stir under nitrogen atmosphere for 7 hours, after which time an additional 5 mL of the solution of octylmagnesium iodide was added to the flask via syringe. After an additional 16 hours, 10 mL of a 5% aqueous solution of $Na_2S_2O_3$ was added to the flask and the mixture was allowed to stir for 1 hour. The heterogeneous mixture was transferred to a separatory funnel and the organic phase was separated from the aqueous phase. This organic phase was dried in a glass dish at 70° C. to afford 0.28 g of a dark solid. Mass spectrometric analysis indicated that the solid was a mixture of compounds corresponding to the formula $C_{60}(C_8H_{17})_n$ where n=1 to 17 and where the average value of n is 11.

Stabilization of Water-in-Oil Emulsions

Solutions or dispersions of the surface-modified STARBURST® dendrimers were made in toluene, at the concentrations specified in Table 1, by combining, in screw-cap glass vials, the calculated amount of the compounds and 2 mL of toluene. When the compounds were, or appeared to be, dissolved, 1 g of the toluene solution and 1 g of water were combined in a screw-cap glass vial, the vial was capped, and was then shaken vigorously by hand for 15 seconds. The emulsions that formed comprised less than 50 volume percent water, as evidenced by the separation of a homogeneous water phase from the emulsion phase. Octyl-$C_{60}$ was dissolved in toluene to give 3 g of a 2% solution. This was combined with 3 g of water in a screw cap vial, and the emulsification was carried out as described above. The data are given in Table 1.

TABLE 1

| Example | Emulsifying Agent | Concentration | Emulsion |
| --- | --- | --- | --- |
| Comparative 1 | None | N/A | No |
| Comparative 2 | $C_{60}$ | 2% | No |
| 1 | Octyl-SG-2 | 2% | Yes |
| 2 | Octyl-SG-4 | 2% | Yes |
| 3 | Octyl-$C_{60}$ | 2% | Yes |

Stabilization of Oil-in-Water Emulsions

Solutions or dispersions of 20 nm, 30 nm, 50 nm and 60 nm surface-modified polystyrene microspheres (available from Bangs Laboratories, Inc., Fishers, Ind.) were made in water at a concentration of 2%. When the compounds were, or appeared to be, dissolved, 1 g of the aqueous solution and 1 g of toluene were combined in a screw-cap glass vial, the vial was capped and was then shaken vigorously by hand for 15 seconds. The emulsions that formed comprised less than 50 volume percent toluene, as evidenced by the separation of a homogeneous toluene phase from the emulsion phase. The data are given in Table 2.

TABLE 2

| Example | Emulsifying Agent | Emulsion |
| --- | --- | --- |
| 4 | 20 nm polystyrene microspheres | Yes |
| 5 | 30 nm polystyrene microspheres | Yes |
| 6 | 50 nm polystyrene microspheres | Yes |
| 7 | 60 nm polystyrene microspheres | Yes |

All patents, patent applications, and publications cited herein are each incorporated by reference, as if individually incorporated. Foreseeable modifications and alterations of this invention will be apparent to those skilled in the art without departing from the scope and spirit of this invention. This invention should not be restricted to the embodiments that are set forth in this application for illustrative purposes.

What is claimed is:

1. An emulsion comprising:
   a continuous liquid phase comprising a plurality of surface-modified fullerenes, dispersed in said continuous phase, wherein the surface modification comprises alkyl groups; and
   a dispersed liquid phase dispersed in said continuous phase.

2. The emulsion of claim 1 wherein the organic molecules are $C_{60}$, $C_{70}$, $C_{82}$, or $C_{84}$ fullerenes, or combinations thereof.

* * * * *

UNITED STATES PATENT AND TRADEMARK OFFICE
CERTIFICATE OF CORRECTION

PATENT NO. : 7,001,580 B2  Page 1 of 1
APPLICATION NO. : 10/335495
DATED : February 21, 2006
INVENTOR(S) : Jimmie R. Baran, Jr.

It is certified that error appears in the above-identified patent and that said Letters Patent is hereby corrected as shown below:

Title page,
Item 56, References Cited, U.S. PATENT DOCUMENTS, delete
"2003/0228339 A1    12/2003   El-Nokaty et al," and insert in place thereof
-- 2003/0228339 A1    12/2003   El-Nokaly et al. --.
Item 56, References Cited, OTHER PUBLICATIONS, delete "Dispersants", Encyclopedia of Chemical Technology, Fourth Editionm, Kirk-Othmer, vol. 8, Deuterium and Tritum to Elastomers, Polyethers, 1993, pp. 293-311" and insert in place thereof -- "DISPERSANTS", Encyclopedia of Chemical Technology, Fourth Edition, Kirk-Othmer, vol. 8, Deuterium and Tritium to Elastomers, Polyethers, 1993, pp. 293-311 --.
Item 56, References Cited, OTHER PUBLICATIONS, delete "Website Article: Jacoby, "Nanoparticles Stabilized Colloids", Chemical & Engineering news, http://pubs.acs.org/cen/topstory/8001/5001notw8.html, Nov. 14, 2002" and insert in place thereof -- Website Article: Jacoby, "Nanoparticles Stabilize Colloids", Chemical & Engineering News, http://pubs.acs.org/cen/topstory/8001/8001ntotw8.html, Nov. 14, 2002 --.
Item 56, References Cited, OTHER PUBLICATIONS, delete "Binks, "Particles as surfactants – similarities and differences", ELSEVIER, Currnet Opinion in Colloid & Interface Science 7 (2002), pp. 21-41" and insert in place thereof -- Binks, "Particles as surfactants – similarities and differences", ELSEVIER, Current Opinion in Colloid & Interface Science 7 (2002), pp. 21-41 --.

Signed and Sealed this

Twenty-seventh Day of March, 2007

JON W. DUDAS
*Director of the United States Patent and Trademark Office*